United States Patent [19]

Hartmann

[11] Patent Number: 4,553,251
[45] Date of Patent: Nov. 12, 1985

[54] METHOD AND SYSTEM FOR SYNCHRONIZING THE CODING AND DECODING DURING THE TRANSMISSION OF DIGITAL CODED DATA

[75] Inventor: Peter Hartmann, Hausen, Switzerland

[73] Assignee: BBC Brown, Boveri & Company, Limited, Baden, Switzerland

[21] Appl. No.: 522,652

[22] Filed: Aug. 12, 1983

[30] Foreign Application Priority Data

Aug. 19, 1982 [CH] Switzerland .................. 4952/82

[51] Int. Cl.$^4$ .............................................. H04L 7/00
[52] U.S. Cl. ....................................... 375/114; 328/74
[58] Field of Search ............. 375/111, 114, 116, 119; 370/100, 105, 106; 364/728, 819; 340/825.2; 328/72, 74, 55

[56] References Cited

U.S. PATENT DOCUMENTS

| | | | |
|---|---|---|---|
| 3,576,947 | 5/1971 | Kruger | 370/105 |
| 4,035,601 | 7/1977 | Isaacs | 375/116 |
| 4,112,498 | 9/1978 | Reiner et al. | 375/114 |
| 4,203,070 | 5/1980 | Bowles et al. | 375/115 |
| 4,276,642 | 6/1981 | Siglow et al. | 370/105 |
| 4,302,831 | 11/1981 | Zemanek | 375/111 |
| 4,316,285 | 2/1982 | Bobilin | 370/105 |

FOREIGN PATENT DOCUMENTS 2517481  4/1976  Fed. Rep. of Germany .

OTHER PUBLICATIONS

"Cryptographic Requirements for Digital Secure Speech Systems", Electronic Engineering, Feb. 1980, pp. 37–46.

Primary Examiner—Benedict V. Safourek
Attorney, Agent, or Firm—Oblon, Fisher, Spivak, McClelland & Maier

[57] ABSTRACT

A method and a system for synchronizing the coding and decoding of data during the transmission of and reception of the data, wherein after a start synchronization, correlations are carried out in several time slots of the received data stream with plural identical synchronizing signal sequences which are generated at the receiver and are displaced in time with respect to one another. By correlating one of these sequences with the identical synchronizing sequence which has been periodically inserted into the data stream at the transmitter, the state of synchronization is monitored and, if necessary, corrected. The invention combines the advantages of continuous synchronization with the rapid restoration of synchronization after disturbances in the transmission.

8 Claims, 6 Drawing Figures

METHOD AND SYSTEM FOR SYNCHRONIZING THE CODING AND DECODING DURING THE TRANSMISSION OF DIGITAL CODED DATA

BACKGROUND OF THE INVENTION

1. Field of the Invention

The present invention relates to a method for synchronizing the coding and decoding during the transmission of digital, coded data from a transmitter to a receiver, a sequence of synchronizing signals being generated at a first clock rate at the transmitter and periodically being inserted into a data stream which is transmitted at a second clock rate, plus a system for carrying out this method.

2. Description of the Prior Art

Facilities for coding are preferably used if information which is transmitted along easily accessible transmission paths should be intelligible only for a certain receiver or for a specified circle of receivers. Known examples are radio links which can be monitored with technical means which are accessible to anybody.

The signal to be coded is coded in the transmitter in a code modulator which is controlled by a code generator. The output signal of the code modulator, which is now coded, is transmitted to the receiver and the transmission path can be, for example, a telephone line or a radio link. In the receiver, the received signal is fed to a code demodulator which is also controlled by a code generator. The output signal from the code demodulator is exactly identical to the original signal when the same code has been set at the two code generators and the code computers are running in synchronism.

In a known design of a coding facility for speech signals, the speech signal, which is present at the transmitter in an analog form, is first converted in an analog/digital converter into a binary data stream which is coded by the modulo 2 addition of a binary pseudo random sequence generated by the code generator. At the receiver, decoding is done by further modulo 2 addition of the same pseudo random sequence. The resulting sum signal is used to recover the analog speech signal by means of digital/analog conversion.

In a known design of a code computer, the secret pseudo random sequence is generated from a pseudo random sequence (source signal), which is not secret in itself, in a sequential logic system the sequences of which are a function of the secret code. The source signal generator used can be a random generator containing a shift register and an EXCLUSIVE OR gate the two inputs of which are each connected to a storage location and the output of which is or are connected to the input of the shift register. If the same initial signal sequence is read into the shift registers of two random generators of this type, which are constructed in the same way, and if the generators are operated synchronously, the same signals will appear at each of the successive operating clock pulses at the outputs of the EXCLUSIVE OR gates.

For synchronous operation of the source signal generators in the transmitter and receiver unit, each unit contains a crystal-controlled oscillator which functions as the clock generator. The clock generator in the receiver unit is associated with a phase control loop which secures frequency and phase tracking. Different methods are customarily used for setting the same signal sequences of the source signal generators.

During start synchronization, at the beginning of a transmission, a coherent sequence of synchronizing signals is transmitted, during continuous synchronizing synchronizing signals are periodically inserted into the stream of coded signals transmitted, which synchronizing signals sequence or periodic synchronizing signals, respectively, are read into the shift register of the source signal generator in the receiver unit. The start synchronization makes it possible rapidly to adjust the tracking of the source signal generator in the receiver unit but has the disadvantage that in the case where a receiver unit has been switched in only after the synchronizing signal sequence has been sent out, the tracking of the source signal generator cannot be set or can only be set when a further synchronizing signal sequence is sent out, that the adjustment of tracking and the tracking of the source signal generator itself can be disturbed by third parties and that after a disturbance and independently of its cause, the tracking of the source signal generator and thus the correct decoding of received coded information remains interrupted until a further synchronizing signal sequence is sent out. In contrast, continuous synchronization makes it possible to switch in one or several receiver units even after a transmission has begun, and the source signal generator in the receiver unit can recover its tracking after a disturbance. These advantages of continuous synchronization must be compared with the disadvantage that the adjusting of the tracking of the source signal generator in the receiver unit takes much longer than in the case of start synchronization. If synchronization is lost during transmission, for example because of fading or phase shifts in the signal sequence, resynchronizing takes a relatively long time.

SUMMARY OF THE INVENTION

For above-noted reasons, the objects of the present invention are to eliminate the disadvantages described and to create a method for synchronizing the source signal generator at the receiver in a system for transmitting coded data, by means of which the displacement in time of the source signals generated in the receiver with respect to the synchronizing signals in the data stream can be corrected practically without any time delay.

According to the invention, these objects are achieved by means of a method of the type mentioned initially, which method is characterized in that, after initial synchronization at the receiver, at least one signal sequence which corresponds to the sequence of synchronizing signals which have been inserted, is generated and the transmitted data stream is subdivided into time frames $R_n$ having several time slots $s_n$, $i_{n,1} \ldots i_{n,9}$ the length of a frame $R_n$ being equal to the duration of the period of the first clock rate and the length of a time slot being equal to the duration of the period of the second clock rate and that the signal sequence generated at the receiver is used to carry out correlations in several time slots of the received data stream and the results of these correlations are used for monitoring the received data stream and correcting the synchronization in the receiver.

The invention makes it possible, after each interruption or disturbance of the transmission and with a change in direction, to compare the receiver synchronizing signals with a plurality of source signal sequences, with the result that a synchronizing signal which is displaced within the range of one frame of the receiver signal sequence is always tracked by a source signal sequence generated in the receiver and that this tracking source signal sequence is passed on to the code computer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
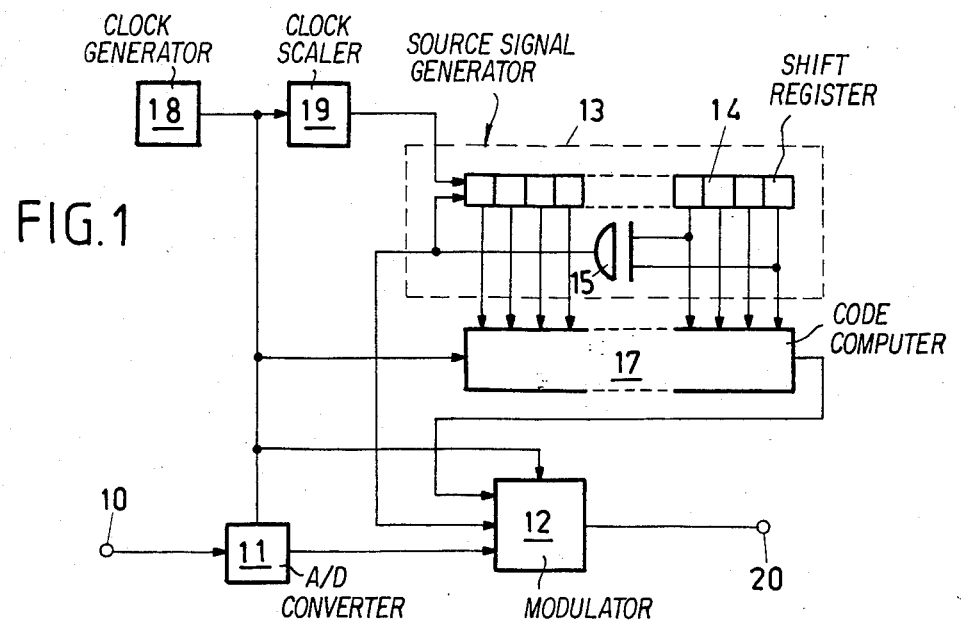
FIG. 1 is the greatly simplified circuit diagram of the transmitter unit section intended for coding data.

Referring now to the drawings, wherein like reference numerals designate identical or corresponding parts throughout the several views, and more particularly to FIG. 1 thereof, there is shown in a greatly simplified manner a transmitter unit section suitable for the coding of speech signals. Reference numeral 10 designates an input terminal for an analog input signal. From the input terminal, a line leads to the signal input of an A/D converter 11 the output of which is connected to a first input of a modulator 12. In addition, this section of the transmitter unit contains a source signal generator 13 comprising a shift register 14 and an EXCLUSIVE OR gate 15 which hereinafter will also be called X-OR gate. The two inputs of this X-OR gate are connected to two storage locations in the output section of the shift register and from the output of the X-OR gate a branched connecting line leads to the input of the shift register 14 and to a second input of the modulator 12. The storage locations of the shift register are connected to the inputs of a code computer 17. The output of the code computer is connected to a third input of the modulator 12.

The section of the transmitter unit described is connected to a clock generator 18 which supplies the operating clock pulses at least for the A/D converter, the code computer and the modulator and the input signals for a clock scaler 19 which generates a scaled down operating clock pullse for the source signal generator.

When this transmitter unit is operating, the analog input signal is converted in the A/D converter 11 into a sequence of plain binary signals which are entered into the modulator 12 at the rate of the clock generator 18. The operating clock pulse generated by the clock generator is scaled down in the scaler 19, for example at a ratio of 10:1 and the scaled-down clock sequence is used for controlling the shifting of the binary signals in the shift register. By feeding back the contents of two locations of the shift register via the X-OR gate 15 to the input of the shift register, the content of the register is changed with each pulse of the scaled-down clock sequence. With each operating clock pulse, the contents of the storage locations are read into the code computer 17 at the output of which then a coding signal for the modulator appears. Simultaneously, with each pulse of the scaled-down clock sequence, the output signal of the X-OR gate 15 (or the input signal for the shift register, respectively) is fed to the modulator for the duration of one operating clock pulse and inserted into the sequence of the coded or crypto-signals.

Figure 2:
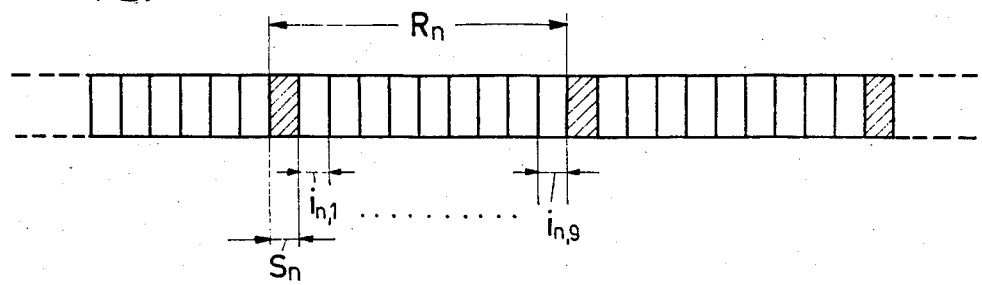
FIG. 2 is a diagrammatic representation of a sequence of digital data including synchronizing signals which have been periodically inserted.

In FIG. 2, the crypto-signal sequence appearing at the output terminal 20 of the transmitter unit section shown in FIG. 1 is shown diagrammatically with synchronizing signals which have been periodically inserted. According to this, the signal sequence consists of successive time frames $R_n$ of which, in the example selected, each is provided with ten time slots of which one is used as the synchronising slot $s_n$ and the others are used as a sequence of nine data slots $i_{n,1}, i_{n,2}, \ldots i_{n,9}$. The length of the frames corresponds to the duration of a period of the scaled-down operating clock pulse for the source signal generator.

Figure 3:
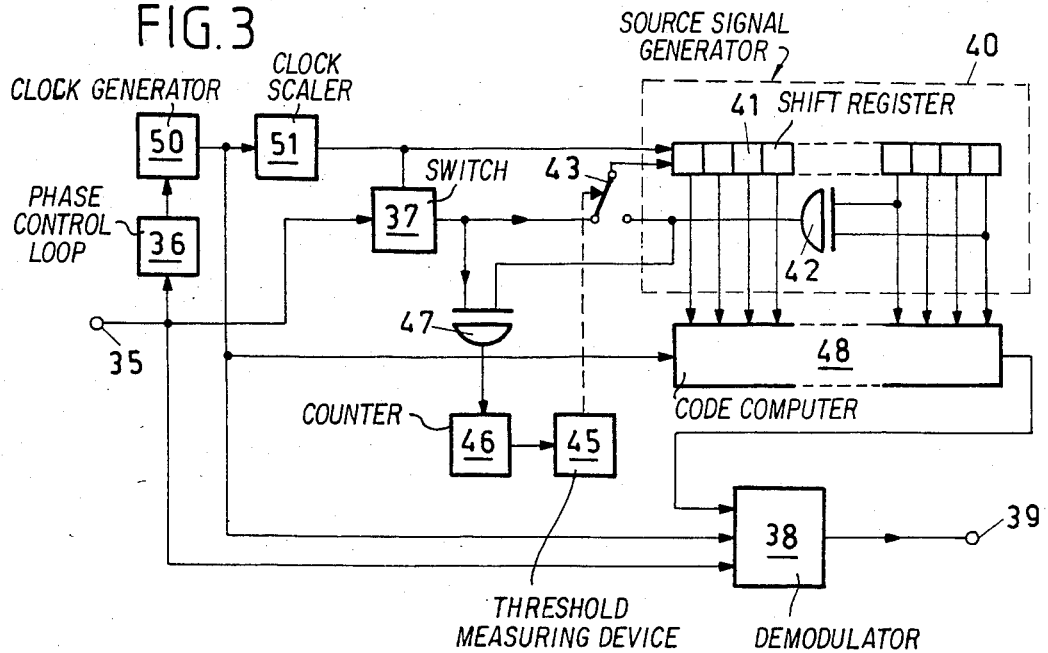
FIG. 3 is a greatly simplified block diagram of the receiver unit section intended for the decoding of data in accordance with the state of the art.

FIG. 3, drawn in a greatly simplified manner, illustrates a receiver unit for decoding a crypto-signal sequence, including an input terminal 35 which is connected to a phase control loop 36, a switch 37 and an input of a demodulator 38. This section of the receiver unit also contains a source signal generator 40 provided with a shift register 41 and an X-OR gate 42. The two inputs of this X-OR gate are connected, in the same manner as in the source signal generator in the transmitter unit, to storage locations in the shift register. From the input of the shift register, a line leads to a change-over switch 43 which is provided for the optional connection of the input of the shift register to the output of the X-OR gate 42 or to the output of the switch 37. For controlling the change-over switch 43, a threshold measuring device 45 is used the input of which is connected to the output of a counter 46. The counter is connected to the output of a further X-OR gate 47 the inputs of which are connected to the output of the X-OR gate 42 belonging to the source signal generator and to the output of the switch 37, respectively. From the storage locations of the shift register, lines lead to associated inputs of a code computer 48, the output of which is connected to a second input of the demodulator 38. The decoded signal appears at the output terminal 39 of the demodulator. The phase control loop 36 acts in conjunction with a clock generator 50 the output of which is connected to the code computer and the demodulator and to a clock scaler 51 from which lines lead to the shift register 41 and to the switch 37.

For a functional description of this section of the receiver unit, let it be assumed that the clock generator 50 generates operating clock pulses at the same rate as the clock generator in the transmitter unit, that the phase control loop 36 causes the phase of the operating clock pulses generated to track the signals of the crypto-signal sequence fed to the input terminal 35, that the scaling ratio of the clock scaler 51 is equal to that of the clock scaler 19 in the transmitter unit and that the change-over switch 43 is in the position shown in FIG. 3 when the receiver unit is switched on or at the beginning of a transmission. Each pulse of the clock scaler 51 clocks on the switch 37 so that the synchronizing signals from the stream of the crypto signals appearing at the input terminal 35 are read into the shift register 41 via the change-over switch 43. As soon as the number of synchronizing signals read in is equal to the ordinal nummber of the storage location connected to an input of the associated X-OR gate and is farthest removed from the input of the shift register, the contents should be identical in the transmitter and in the receiver unit from the first storage location previously defined, if transmission is undisturbed. In this case the signals appearing at the output of the X-OR gates working in conjunction with the shift registers and which, in the receiver unit, are also fed to the further X-OR gate 47, are also identical. The successive output signals, corresponding to identical signals, of this further X-OR gate are counted in the counter 46 and the counter status is fed to the threshold-measuring device 45. As soon as this device 45 reaches a presettable threshold, the change-over switch 43 is switched over. Then the supplying of synchronizing signals from the stream of the crypto-signals is interrupted and the output signals of the X-OR gate 42 are read into the shift register so that the signal generator runs autonomously. With each operating clock pulse, the contents of the storage locations of the shift register in the receiver unit then correspond to the contents of the corresponding storage location of the transmitter unit which is why (with the same code) the output signal of the code computer 48 in the receiver unit also equals that in the transmitter unit and at the output 39 of the demodulator 38 a plain signal appears which corresponds to the plain signal entered into the transmitter unit.

In the synchronizing device described, the source signal generator in the receiver unit lags that in the transmitter unit by the transit time of the electromagnetic waves between the transmitter and receiver unit. This time displacement is without practical significance because for the decoding of the crypto signals only the tracking between the source signal generator in the receiver unit and the clock and the phase of the received signals is of importance. If transmission is interrupted for a brief period, for example by fading and thus the phase control loop becomes ineffective, the possibility exists that the phases of the signal sequence received and of the signal sequence generated by the source signal generator in the receiver will diverge. If, for example, the clock rate is 16 k Bits/second and the stability of the source signal generator is $\pm 2.10^{-5}$, the phase can be shifted by 3.2 clock pulses if reception is interrupted for 10 seconds. Also if the direction of transmission is changed, if the previous receiver becomes the transmitter and the previous transmitter becomes the receiver, the abovementioned phase shift resulting from the transit time of the electromagnetic waves will occur. Because in a change of direction, the phase shift is proportional to twice the distance between the transmitter and the receiver, a distance of about 10 km already causes a phase shift of more than one Bit duration at the clock rate of 16 k Bits/second mentioned by way of example.

Figure 4:
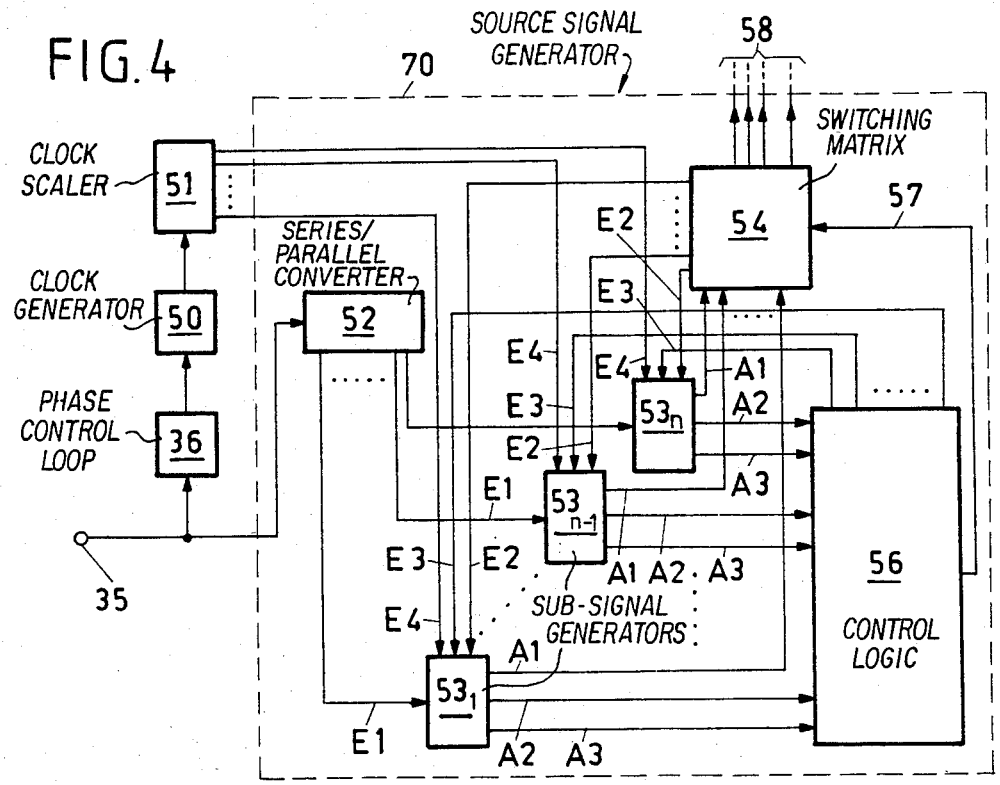
FIG. 4 is a block diagram of an embodiment of the synchronizing device according to the invention.

In order to secure tracking betwene the crypto signals received and the source signals at the receiver and thus correct decoding, the source signal generator according to the invention contains at least as many sub-signal generators as a frame $R_n$ in the signal sequence transmitted contains time slots. The block diagram of a preferred embodiment of this source signal generator is shown in FIG. 4. The crypto signal arriving at the input terminal 35 is fed via a line to the series/parallel converter 52 the outputs of which are connected to one input E1 of each of the sub-signal generators $53_1$ to $53_n$.

Each sub-signal generator is provided with three outputs A1, A2, A3, the first A1 of which is connected to an input of a switching matrix 54 and the two outputs A2, A3 of which are connected to the inputs of a control logic 56. The outputs of the switching matrix are each connected to a second input E2 and outputs from the control logic are each connected to a third input E3, respectively, of the sub-signal generators. A further line 57 leads from the control logic to the switching matrix and lines 58 are provided for connecting the switching matrix to the code computer (not shown).

Figure 5:
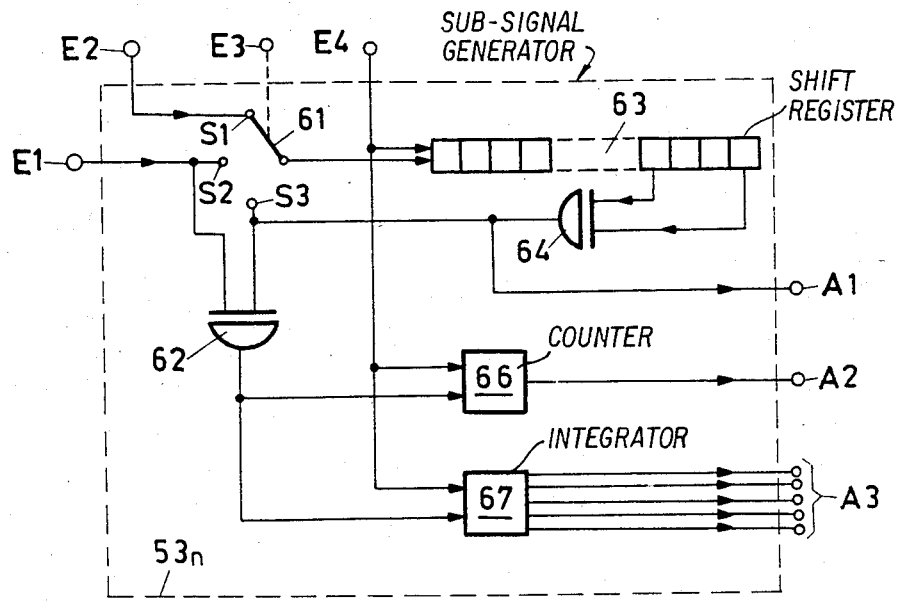
FIG. 5 is a block diagram of an embodiment of the subsignal generator in the device according to FIG. 4.

A successful embodiment of a sub-signal generator is shown in FIG. 5. From the input terminal E1, a branched line leads to a first contact S2 of a three-pole change-over switch 61 and to a first input of a first X-OR gate 62. The switching contact is connected to the input of a shift register 63, the outputs of two storage locations of which are connected to the inputs of a second X-OR gate 64. From the output of this second X-OR gate a further branched line leads to a further contact S3 of the change-over switch 61, to the second input of the first X-OR gate 62 and to the signal output terminal A1. The output of the first X-OR 62 is connected to the inputs of a counter 66 and of an integrator 67 the outputs of which form outputs A2 and A3, respectively, of the sub-signal generator.

The sub-signal generator also contains an input E2 for a signal from the switching matrix 54 shown in FIG. 4 and an input E3 for the signals generated by the control logic 56 for actuating the change-over switch 61, and an input E4 for the synchronizing pulses from the clock scaler 51 shown in FIG. 4, which synchronizing pulses are displaced with respect to one another by one operating clock pulse each in adjacent sub-signal generators.

During the operation of the signal generator according to the invention, the sequence of the crypto-signals arriving at the input terminal is entered into the series/parallel converter 52 and passed on in parallel to the n sub-signal generators. The result of this is that, if the individual Bits of the crypto signal sequence are consecutively numbered, for example at the input E1 of the sub-signal generator $53_1$ the Bits with the ordinal numbers 1, n+1, 2n+1, 3n+1, and so forth occur in the sequence specified whereas, for example, at the input E1 of the next sub-signal generator $53_2$ correspondingly the Bits with the ordinal numbers 2, n+2, 2n+2, 3n+2 and so forth will appear. For the remaining sub-signal generators analogous Bit sequences apply. Thus the n sub-signal generators in conjunction with the series/parallel converter form a frame $R_n$ from n successive time slots.

Since the length of the frame $R_n$ corresponds to the duration of a period of the scaled-down operating clock pulse, the inserted synchronizing Bits always occur in the same time slot of a frame if synchronization exits, that is they also occur at the input E1 of the same sub-signal generator, that is to say if synchronization exists, at the input of one of the n sub-signal generators the complete sequence of the synchronizing Bits appears whereas at the inputs of the remaining sub-signal generators sequences of selected crypto-signals arrive.

During the start synchronization at the beginning of a transmission, the change-over switch 61 in each sub-signal generator is in position S2 so that the received signal sequence is read into the shift registers 63. The output signals of the second X-OR gate 64 are compared in the first X-OR gate 62 with the incoming signals and the number of successive correct comparisons are counted in the counter 66. As soon as the counter in one of the sub-signal generators reaches a preset value, a signal appears at output A2 which is passed on to the control logic 56. The control logic then causes the switch 61 to switch over to position S3, and thus autonomous operation of this sub-signal generator, the output signal of which at terminal A1 is then fed to the switching matrix 54 and appears as the source signal for the code computer at the output of the switching matrix. Simultaneously, the control logic 56 also causes the switch 61 in the other sub-signal generators to switch over to position S1, and thus the reading-in of the output signals (fed in via the switching matrix) of the sub-signal generator, running autonomously, into the shift registers of the latter.

The output signal sequence of the sub-signal generator running autonomously is furthermore compared in the first X-OR gate 62 with the received signal sequence and the output signals of this gate are fed to the integrator 67. This integrator is preferably a digital embodiment of an RC integrator and generates an output signal which is a measure of the correlation of the two signal sequences.

After the (phase-shifted) reading in of the output signal sequence of the sub-signal generator, which is running autonomously, into the other sub-signal generators, the change-over switches 61 of the latter are also switched to position S3 so that these generators also run autonomously. Then at the output A3 of each sub-signal generator a signal appears which is a measure of the correlation of the signal sequence, which has been generated, with the source signal sequence arriving at input E1.

As can be immediately seen by any expert in this field, the source signal generator described ensures that a synchronizing signal which is running synchronously with one of the sub-signal generators immediately finds another synchronously running sub-signal generator after a phase shift which may have occurred during fading in the transmission or a phase change effected during the switching-over of the direction of transmission or by interference signals. The integrator 67 of this synchronously running sub-signal generator then generates an output signal A3, which corresponds to the result of the correlation between the incoming signal sequence and the signal sequence appearing at the output of the second X-OR gate, for the control logic which then feeds the signal at the output A1 of this sub-signal generator as the new source signal to the switching matrix 54 ( and from there to the code computer) and to the other sub-signal generators. Naturally this method can be used to reduce interfering interruptions in the decoding or interruptions of the transmission to the response time of the correlator because of the rapid resynchronization of the source signal generator in the receiver unit.

Figure 6:
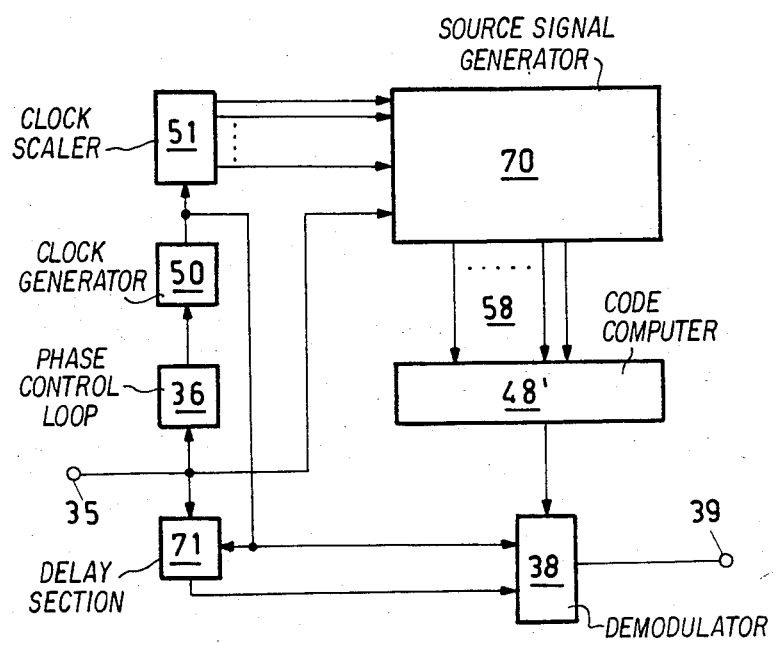
FIG. 6 is a block diagram of an embodiment for compensating for the response time of the correlators.

A further reduction in the duration of the interruption can be achieved by compensating for the response time of the correlator by delaying the received signal and decoding it with a code signal which has been correspondingly delayed. FIG. 6 shows such an arrangement which is provided with a delay section 71 and a code computer 48' and which generates a delayed code signal.

In the example described, the source signal generator contains a sub-signal generator for each time slot in the frame of the transmitted signal sequence which is why this arrangement can be used only for phase displacements in the forward or in the reverse direction. In order to be able to correct phase displacements in the forward and in the reverse direction, the source signal generator must be provided with a greater number of sub-signal generators.

If within a communications network, for example a radio network, both coded and uncoded signals are transmitted, the synchronizing signal, which is periodically inserted, can be employed for recognition of the signals which are transmitted in coded form. With the method described, the signal is continuously checked for the presence of the synchronizing signal so that the method can also be used for controlling the switching over between coded and uncoded signals.

The new device can be constructed with known semiconductor components and it is also possible to design the new source signal generator as a semiconductor component. Suitable components and the technology of producing new components are known to any expert in the field which is why a detailed description of these has been deliberately omitted.

Obviously, numerous modifications and variations of the present invention are possible in light of the above teachings. It is therefore to be understood that within the scope of the appended claims, the invention may be practiced otherwise than as specifically described therein.

What is claimed as new and desired to be secured by Letters Patent of the United States is:

1. A method for synchronizing coding and ecoding during transmission of digital, coded data from a transmitter to a receiver, comprising:
   generating at the transmitter a sequence of transmitter synchronization signals at a first clock frequency;
   periodically inserting said sequence of transmitter synchronization signal into a data stream transmitted at a second clock rrequency so as to form an encoded signal sequence in the form of plural frames each equal to the cycle duration of the first clock frequency and each including plural slots equal to the cycle duration of the second clock frequency;
   transmitting said encoded signal sequence so as to be received by the receiver;
   generating at said receiver at least one sequence of receiver synchronization signals which coincides with the sequence of transmitter synchronization signals and which is synchronized with the transmitter synchronization signals of the received encoded signal sequence;
   dividing the received encoded signal corresponding to the cycle duration of the first clock frequency, into plural time slots equal to the cycle duration of the second clock frequency;
   successively storing the data content of each slot offset by a clock cycle duration of the second clock frequency in a respective subsignal generator;
   thereafter switching all subsignal generators over to self-production of the signal sequences read into the respective subsignal generator;
   correlating the self-produced signal sequences of the subsignal generators with the data content of the corresponding slots of the incoming received data sequence;
   determining that synchronization has occurred as a function of a predetermined correlation of a self-produced signal sequence with the received signal sequence in any said subsignal generator;

synchronizing all other subsignal generators upon determining a synchronmization of one of said subsignal generators; and thereafter switching over all subsignal generators over to autonomous operation in which each subsignal generator produces the sequence of synchronization signals transmitted, but offset by the cycle duration of the second clock frequency.

2. A method according to claim 1, comprising:
compensating for a response time during the correlating step by delaying the received data signal sequence and generating a delayed received sequence of encoded signals.

3. A method according to claim 1, comprising:
initiating, when correlation is missing, a resynchronization in all times slots after a predetermined time has elapsed, wherein a starting point of the predetermined time is selected as a function of a quality criterion of the received encoded data signal sequence.

4. A method according to claim 3, comprising: characterizing the received data signal sequence as an uncoded signal if initial synchronization does not take place or resynchronization does not take place after a predetermined period of time.

5. A method according to claim 1, comprising:
determining the achievement of synchronization as a function of a maximum correlation of the self-produced signal sequence of a subsignal generator with the signal sequence received by the respective subsignal generator;

performing and constantly controlling synchronization during the transmission of the data stream; and using a pseudo random sequence to produce the sequence of synchronization signals.

6. A system for transmitting and receiving coded data, said system comprising:
at least one transmitter having a clock generator, a clock scaler clocked by the clock generator, a source signal generator clocked by the clock scaler, a code computer clocked by the clock generator and a modulator which codes a stream of data signals by inserting at each nth clock pulse from said clock generator a synchronizing signal, which has been generated by the source signal generator ands said code computer, into the stream of data signals; and at least one receiver having a clock generator which operates in conjunction with a phase control loop controlled by the received signals, a clock scaler clocked by the clock generator, a source signal generator clocked by the clock scaler, a code computer coupled to the source signal generator for producing a decoding signal, and a demodulator which decodes the stream of coded data signals by means of the decoding signals;

wherein the source signal generator in the receiver comprises plural sub-signal generators for generating identical code signal sequences which are displaced with respect to one another by at least one operating clock pulse from said clock scaler, each sub-signal generator comprising means for comparing the tracking of the synchronizing signals in the received signal sequences with the signal sequences generated in the sub-signal generator and for producing a corresponding output;

said receiver comprising logic means for evaluating the outputs of said sub-signal generators, and for connecting that sub-signal generator having an output indicating that the synchronizing signals thereof show the greatest agreement with the synchronizing signals in the received signal sequence, to the synchronizing signal input of the code computer and to signal inputs of the other sub-signal generator;

wherein each sub-signal generator comprises:
a shift register, a first X-OR gate and a changeover switch interconnected so that an input of said shift register can be optionally connected to an input terminal for the received signals, to an output of said first X-OR gate, or to a signal output of one of the other sub-signal generators, said first X-OR gate having two inputs which are respectively connected to predetermined storage locations in the shift register, and a second X-OR gate having two inputs respectively connected to the input terminal for the received signals and to the output of the first X-OR gate, a counter having an input connected to an output of said second X-OR gate, an integrator having an input connected to the output of said second X-OR gate, and a first output terminal connected to the output of the second X-OR gate and serving as an output signal of the sub-signal generator, and second and third output terminals connected to outputs of the counter and of the integrator, respectively; and wherein the source signal generator comprises a series/parallel converter which passes the received signal sequence with clock displacement onto the input terminals of the sub-signal generators.

7. A system according to claim 6, wherein for the purpose of synchronization and in consideration of phase displacements or phase changes in the forward or in the reverse direction, the number of sub-signal generators is greater or equal to the number of time slots of a frame in the transmitted data stream.

8. A device according to claim 6, comprising:
a delay section inserted between an input terminal and the demodulator for delaying the received coded signal sequence to compensate for a time delay produced in said comparing means.

* * * * *